Oct. 18, 1960    EIICHI GOTO    2,957,087
COUPLING SYSTEM FOR AN ELECTRIC DIGITAL COMPUTING DEVICE
Filed Sept. 10, 1956    3 Sheets-Sheet 3
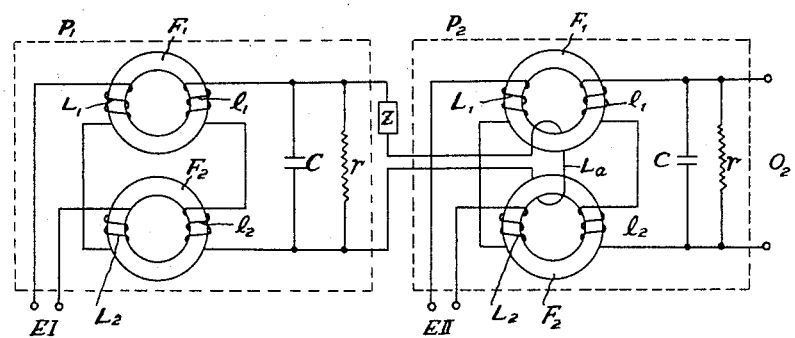
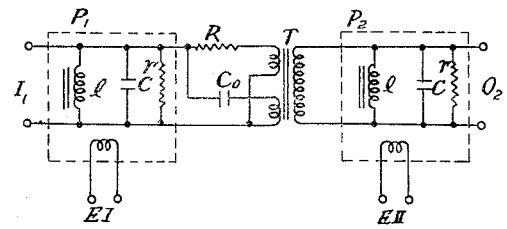

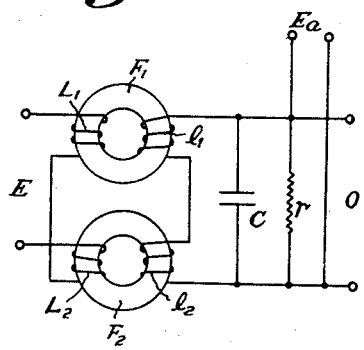
Fig-1A-
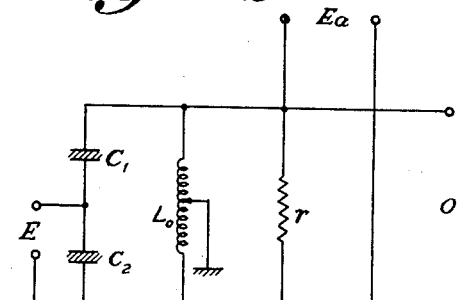
Fig-1B-
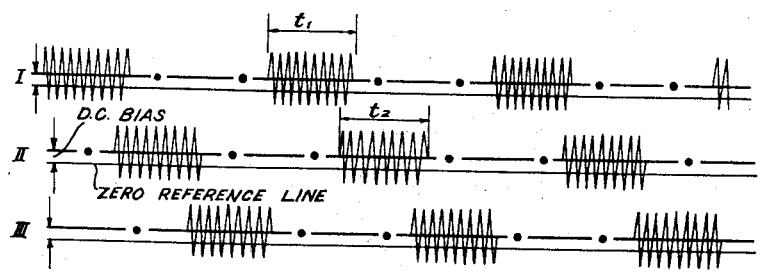
Fig-2-
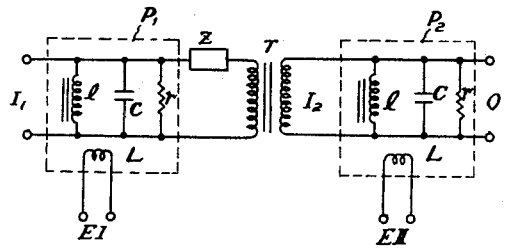
Fig-3-

United States Patent Office 2,957,087
Patented Oct. 18, 1960

2,957,087

COUPLING SYSTEM FOR AN ELECTRIC DIGITAL COMPUTING DEVICE

Eiichi Goto, Meguro-ku, Tokyo-to, Japan, assignor to Kokusai Denshin Denwa Kabushiki-Kaisha, Chiyoda-ku, Tokyo-to, Japan Filed Sept. 10, 1956, Ser. No. 608,737

Claims priority, application Japan Sept. 16, 1955

6 Claims. (Cl. 307—88)

This invention relates to an improved coupling system for an electric digital computing device comprising parametrically excited resonators.

Such parametrically excited resonators have been disclosed in the U.S. patent application Ser. No. 508,668, filed by the inventor.

In a resonance circuit including a nonlinear reactor such as ferro-magnetic inductor or ferro-electric capacitor having hysteresis characteristics beteween the electric or magnetic field applied thereupon and the electric or magnetic residual induction thereof, a subharmonic oscillation can be produced by varying the resonance frequency of said resonance circuit abruptly with an exciting wave having a frequency about twice as much as the resonance frequency of said resonance circuit (cf. N. W. Mclachlan Ordinary Non-linear Differential Equation, Oxford, 1950).

Hereinafter, the above-mentioned "resonance circuit including a nonlinear reactor" will be merely denoted as "parametron" in order to simplify the specification.

The phase of the subharmonic oscillation of a parametron can be controlled so as to be either one of two phases which are different by 180°, for example, 0 radian and $\pi$ radian. Accordingly, when a weak alternating current having a frequency equal to the resonance frequency of the parametron is applied to the resonant circuit of the parametron at the same time as or slightly prior to the application of exciting alternating current, the phase of the subharmonic oscillation of said parametron is controlled to either one of 0 radian or $\pi$ radian in accordance with the phase of said weak alternating current. The parametron as described above has been used broadly as the element for logical operation circuits in digital computers and electric communication apparatus in order to transform the binary digits "0" and "1" into 0 radian and $\pi$ radian oscillations respectively.

Electric computers, electric communication apparatuses and electric controllers, in which the parametrons as described above are utilized as their circuit elements have been proposed by the same inventor (see U.S. patent application Ser. No. 508,668, filed on May 16, 1955), the principle of said electric apparatus being described in detail later.

An essential object of this invention is to simplify the coupling among parametrons in the above-mentioned electric apparatus.

Another object of this invention is to provide a simple "Not" circuit of a logical operation circuit, in which binary phased signals sent out from the parametrons are used as its operation signals.

A further object of this invention is to carry out transmission of signals between parametrons by the use of a transformer as coupling element among parametrons, without any additional circuit elements and if necessary, to make it possible to adjust voltage transmission phase angle between parametrons.

The constructions and operations, together with further objects and advantages of this invention may best be understood by reference to the following description, taken in conjunction with the accompanying drawings, in which the same parts are indicated by the same letters.

Fig. 1A is a connection diagram illustrating one embodiment of the parametron.

Fig. 1B is a connection diagram illustrating another embodiment of the parametron.

Fig. 2 shows illustrative forms of the exciting waves to be used in the embodiments of this invention.

Fig. 3 is a circuit diagram illustrating one embodiment of this invention.

Fig. 6 is a circuit diagram of another embodiment of this invention.

Fig. 7 is a circuit diagram of a still further embodiment of this invention.

Figure 4:
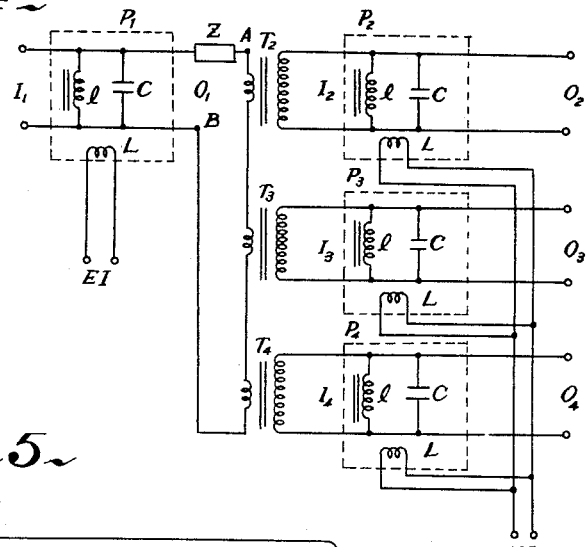
Fig. 4 is a circuit diagram illustrating another embodiment of this invention.

First of all, oscillation principle of the parametron will be described.

In Fig. 1A, the parametron comprises a ferro-magnetic core $F_1$ provided with a primary coil $L_1$ and a secondary coil $l_1$ wound thereon, and another ferro-magnetic core $F_2$ provided with a primary coil $L_2$ and a secondary coil $l_2$ wound thereon, said primary coils and secondary coils being respectively connected in series, and polarity relation between said coils $L_1$ and $L_2$ being inversed to that between said coils $l_1$ and $l_2$ so that secondary output having a frequency equal to that of the exciting current supplied from the exciting terminals E may be eliminated. A condenser C is connected in parallel with the output terminals O so as to form a resonance circuit. A resistance $r$ connected in parallel with the condenser C is used as a damping resistance.

When an exciting current having a frequency about twice as much as the resonance frequency of the resonance circuit (secondary circuit) of the parametron is supplied to the exciting terminals E together with a direct current superposed thereon, an oscillation wave having one half the frequency of said exciting frequency is generated in the resonance circuit, and said oscillation wave can be taken out from the output terminals O, phase of said output wave being either one of the two phases which differ by 180°. The phase of the oscillation wave is determined by the phase of the previously supplied weak control wave having a frequency equal to the oscillation frequency of the parametron, said control wave being supplied from the terminal Ea.

The resonance circuit of the parametron illustrated in Fig. 1B, in which the same parts as the parametron in Fig. 1A are indicated by same letters, consists of nonlinear capacitors $C_1$ and $C_2$ and an inductive coil $L_0$. In this parametron also, oscillation output wave having one half the frequency of the exciting frequency of the parametron can be taken out from the output terminals O by supplying the exciting terminals E with an exciting current having about twice the frequency of said resonance frequency of the parametron together with a direct current superposed thereon.

The oscillation principle of the parametron illustrated in Fig. 1B is similar to that of the parametron illustrated in Fig. 1A, so that principle and embodiments of the parametron will be described in connection with only the parametron in Fig. 1A.

As described above, the parametron has a property that phase of oscillation output thereof can be made to either one of the two phases which differ by 180°, by supplying the parametron with a weak phase control current. Therefore, we can represent binary digits, "1" and "0," by two oscillation phases, $\pi$ radian and 0 radian, of the parametron. Consequently, it is possible to manufacture various electric digital computing apparatuses by suitable combination and connection of the parametrons.

That is to say, when a plurality of parametrons are connected in cascade stages so that the oscillation output waves of the parametrons of a stage may be supplied to the parametrons of the next stage as their control waves, and parametrons of the first, second, third . . . stages are respectively excited with such slightly overlapping exciting waves I, II, III, I, II . . . as shown in Fig. 2, 0 radian or $\pi$ radian phase of the control waves supplied to the parametrons of the first stage is transmitted successively to the second, third, . . . stages, whereby delaying circuits of binary phased signal having time-lags, which are determined in accordance with exciting period, are obtained.

On the other hand, when control signals of odd number, each having 0 radian phase or $\pi$ radian phase and having substantially the same amplitude, are supplied to a parametron, the phase of oscillation output of said parametron is determined by the majority of the phases of the supplied control signals.

Accordingly, when the circuit in which the determination of output phase is carried out by the majority of the phases of input signals is suitably combined with the above-mentioned delaying circuits, it is possible to carry out various kinds of logical operations by binary phased signals.

By utilizing the above-mentioned characteristics of the parametrons, any electric digital computing apparatus such as automatic computers can be readily manufactured.

It will be understood clearly from the above descriptions that the most important feature of the parametron is the phase control action which is attained by applying a weak phase control signal during the non-oscillating period of the parametron.

Therefore, the parametric oscillation of the parametron has to be interrupted by suitable means.

In Fig. 1A, this interruption is attained by interrupting the exciting wave. However, many other methods may be used for the same purpose. For instance, a D.C. bias applied to the exciting terminals E or frequency of the exciting wave may be varied so as to break off the condition necessary to produce the subharmonic oscillation.

As described above, this invention relates to a coupling system capable of coupling the parametrons of an electric digital computing device so as to supply the output signal of one parametron to one or several parametrons of the next stage with least power loss, and by the use of a simple circuit, to supply 0 radian or $\pi$ radian output signal of one parametron to the parametron or parametrons of the next stage after phase conversion from 0 radian to $\pi$ radian and from $\pi$ radian to 0 radian.

The details of this invention will be described in connection with the examples illustrated in Figs. 3–7.

In the embodiment in Fig. 3, each of the parametrons $P_1$ and $P_2$ is the same as that shown in Fig. 1A and consists of two ferromagnetic cores having an exciting coil L and a secondary output coil $l$ wound thereon, a condenser C and a damping resistance $r$, said coil $l$ and condenser C forming a resonance circuit. In order to simplify the drawings, the two pairs of coils $L_1$ and $L_2$, and $l_1$ and $l_2$ in Fig. 1A will be, respectively, called simply as L and $l$, and the cores $F_1$ and $F_2$ are not shown. The parametrons $P_1$ and $P_2$ are coupled through an impedance Z and a transformer T and the exciting terminals EI and EII are respectively excited with such exciting waves I and II as shown in Fig. 2. Said impedance Z may be omitted, but its insertion is convenient for the adjustment of coupling coefficient.

When it is assumed that phase of the oscillation output of the parametron $P_1$ is controlled to 0 radian by a control wave which is supplied to the control terminals $I_1$ during the period $t_1$ of the exciting wave I in Fig. 2, said oscillation output is supplied to the control terminals $I_2$ of the parametron $P_2$ of the next stage through the transformer T, after suitable attenuation thereof by impedance Z. Accordingly, when the parametron $P_2$ is made to oscillate by such exciting wave II as shown in Fig. 2 during the period $t_2$ of said wave II, the oscillation phase of the parametron $P_2$ is controlled by the phase of oscillation output of the parametron $P_1$, because said oscillation output is supplied to the parametron $P_2$ as its control wave at the initial oscillation period of the parametron $P_2$. In this case, the oscillation phase of the parametron $P_2$ becomes 0 radian or $\pi$ radian in response to the polarity of the primary and secondary coils of the transformer T. Accordingly, it is possible to compose readily a signal complementing circuit, that is, logical "Not" circuit by suitable selection of the polarity of the primary and secondary coils of the transformer T. Furthermore, the coupling coefficient between the parametrons $P_1$ and $P_2$ can be varied at will by adjusting the impedance Z and the turn ratio of the transformer T.

Fig. 4 shows a device, in which the oscillation output of one parametron $P_1$ is supplied to three parametrons $P_2$, $P_3$ and $P_4$ through three coupling coupling transformers $T_2$, $T_3$ and $T_4$. According to this embodiment, it is readily possible to make each of the parametrons $P_2$, $P_3$ and $P_4$ oscillate with a phase which is the same or inverse to the oscillation phase of the parametron $P_1$, by means of suitable selection of the polarity of the transformers $T_2$, $T_3$ and $T_4$.

Since a transformer has an impedance-matching action, when the output signal of one parametron is applied, as control signal, to several other parametrons through transformers, it is possible to couple the parametrons with only very little power loss.

Now, when it is assumed that all the parametrons are of the same type, exciting waves of said parametrons have the same amplitude and the ratio of amplitude of the oscillation voltage (or current) to that of the control voltage (or current) is K, the power ratio becomes $K^2$, so that it is possible to supply the output of one parametron to parametrons of $1/K^2$ number at most. Generally, since K is as small as 1/30, it is possible to control the oscillation phases of the parametrons of about one thousand by only one parametron.

In the embodiment in Fig. 4, oscillation outputs of the parametrons $P_2$, $P_3$ and $P_4$ may be supplied to one parametron $P_1$ by inversion of the exciting sequence of the exciting terminals EI and EII.

Figure 5:
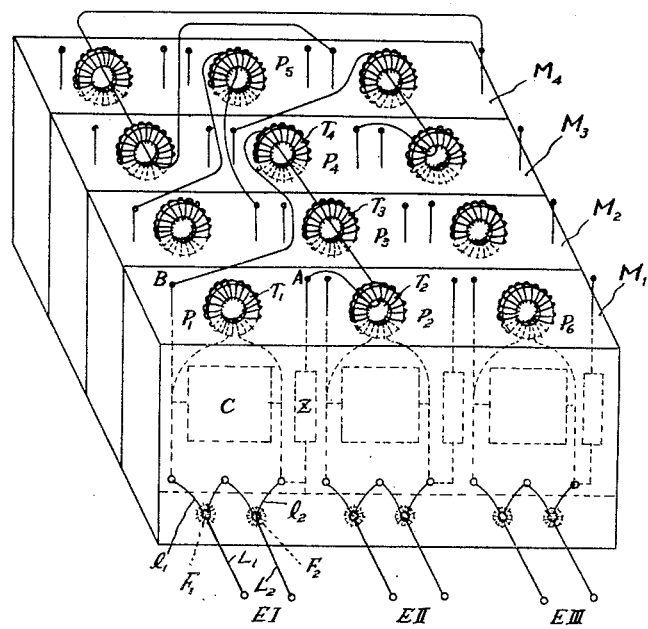
Fig. 5 is a perspective view of a practical arrangement of the embodiment in Fig. 4.

In Fig. 5 is shown another embodiment of an actual construction of the device of this invention, in which four plate-shaped device units $M_1$, $M_2$, $M_3$ and $M_4$ are arranged side by side in a casing. The plate-shaped device unit $M_1$ is made by moulding three parametron units $P_1$, $P_2$ and $P_6$ in plastic resin. This parametron unit $P_1$ is composed of: two toroidal ferro-magnetic cores $F_1$ and $F_2$, each of said cores having a diameter of several millimeters, and the former of which providing with a primary coil $L_1$ and a secondary coil $l_1$ wound thereon and the latter of which providing with a primary coil $L_2$ and a secondary coil $l_2$ wound thereon; a condenser C; a coupling impedance Z; and a coupling transformer $T_1$ having a ferro-magnetic core of a diameter of about one centimeter and primary and secondary coils. The other device units $M_2$, $M_3$ and $M_4$ are made in the same manner as the unit $M_1$. In the device in Fig. 5, for instance, such coupling of one parametron $P_1$ with three parametrons $P_2$, $P_3$ and $P_4$, as in the case of the embodiment in Fig. 4, can readily be carried out by mere connection of the input and output terminals A and B of the parametron $P_1$ with singly turned primary coils of the coupling transformers $T_2$, $T_3$ and $T_4$.

As described above, when transformers are used for the coupling of the parametrons, connection is very simple (only a few inches of wire are needed and no additional circuit element is necessary), and the number of soldering points is reduced remarkably, and parametrons of the same type can be used for various kinds of circuits. All of these features give us important economical advantages.

In Fig. 6 is shown another modified embodiment of this invention, in which each of the parametrons $P_1$ and $P_2$ to be coupled is entirely the same as the parametron in Fig. 1A. For supplying the oscillation output of the parametron $P_1$ to the parametron $P_2$ of the next stage, the magnetic cores $F_1$ and $F_2$ of the parametron $P_2$ are used both as cores of inductive element of a resonator and as cores of a coupling transformer, and both ends of a coil $La$ wound on said magnetic cores are connected with the output terminals of the parametron $P_1$ through an impedance Z. According to such construction, the apparatus becomes very simple, because no particular magnetic core is required for the coupling transformer.

In Fig. 7 is shown a further modification of the embodiment in Fig. 3. In the circuit in Fig. 7, the primary coil of the coupling transformer T is divided into two coils, and to these divided coils are connected in series an impedance consisting of a resistance R and a condenser $C_0$, said two divided coils being connected in parallel to the output terminals of the parametron $P_1$ of the first stage. In this embodiment, it is possible to transmit the oscillation output of the parametron $P_1$ to the parametron $P_2$ of the next stage after shifting the phase between 0 degree and 360 degrees, by suitable conversion of the polarity of the transformer or by adjustment of the resistance and capacity of the resistance R and condenser C. Accordingly, phase adjustment of the control wave may easily be carried out by using coupling transformer in case the number of parametrons is to be reduced by alternative excitation of the successive stages by means of excitation of each stage with different exciting waves of which phases are successively different by 90°.

While particular embodiments of this invention have been described and shown, it will, of course, be understood that the invention would not be limited thereto, since many modifications may be made and all such modifications are within the true spirit and scope of this invention.

What is claimed is:

1. An electric circuit for binary digital operations comprising, a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of at least one succeeding resonant circuit, said coupling means comprising a transformer having first and second windings, said second winding comprising the input of said succeeding resonant circuit and means including an impedance in series with said first winding connecting said first winding across said variable reactance of said preceding resonant circuit, means for varying said parameters comprising at least two alternating power supply circuits each having a frequency $2f$ and means applying said $2f$ frequency from one of said power supply circuits and a bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in the preceding circuits at a time just after the parametric oscillations are generated in the succeeding resonant circuit.

2. An electric circuit for binary digital operations comprising, a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of at least one succeeding resonant circuit, said coupling means comprising a transformer having first and second windings, said second winding comprising the input of said succeeding resonant circuit and means including an impedance in series with said first winding connecting said first winding across said variable reactance of said preceding resonant circuit, means for varying said parameters comprising at least two alternating power supply circuits each having a frequency $2f$ and means applying said $2f$ frequency from one of said power supply circuits and a D.C. bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in the preceding circuits at a time just after the parametric oscillations are generated in the succeeding resonant circuit.

3. An electric circuit for binary digital operations comprising, a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of at least one succeeding resonant circuit, said coupling means comprising a transformer having primary and secondary windings, means connecting said secondary windings with the input of said suceeding resonant circuit and means including an impedance in series with said primary windings connecting said primary windings across said variable reactance of said preceding resonant circuit, means for varying said parameters comprising at least two alternating power supply circuits each having a frequency $2f$ and means applying said $2f$ frequency from one of said power supply circuits and a bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in the preceding circuits at a time just after the parametric oscillations are generated in the succeeding resonant circuits.

4. An electric circuit for binary digital operations comprising, a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of at least one succeeding resonant circuit, said coupling means comprising a transformer having primary and secondary windings, means connecting said secondary windings with the input of said succeeding resonant circuit and means including an impedance in series with said primary windings connecting said primary windings across said variable reactance of said preceding resonant circuit, means for varying said parameters comprising at least two alternating power supply circuits each having a frequency $2f$ and means applying said $2f$ frequency from one of said power supply circuits and a D.C. bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in the preceding circuits at a time just after the parametric oscillations are generated in the succeeding resonant circuits.

5. An electric circuit for binary digital operations comprising a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of a plurality of succeeding resonant circuits, said coupling means comprising a transformer having primary and secondary windings, means connecting said secondary windings with the input of said succeeding resonant circuits and means including an impedance in series with said primary windings connecting said primary windings across said variable reactance of said preceding resonant circuit, means for varying said parameters comprising at least two alternating power supply circuits each having a frequency $2f$ and means applying said $2f$ frequency from one of said power supply circuits and a D.C. bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits for interrupting the oscillations of frequency $f$ in the preceding circuits at a time just after the parametric oscillations are generated in the succeeding resonant circuits.

6. An electric circuit for binary digital operations comprising a plurality of resonant circuits each having a resonant frequency of near $f$ and each including an input, an output and a variable reactance the value of which is a parameter determining the resonant frequency of said resonant circuit, means coupling the resonant circuits to each other with the output of a preceding resonant circuit to the input of at least one succeeding resonant circuit, said coupling means comprising a transformer having primary and secondary windings, means connecting said secondary winding with the input of said succeeding resonant circuit and means including an impedance in series with one of two said primary parallel windings connecting said one primary winding across said variable reactance of said preceding resonant circuit, means for varying said parameters comprising at least two alternating power supply circuits each having a frequency $2f$ and means applying said $2f$ frequency from one of said power supply circuits and a D.C. bias to said variable reactances at least in alternate resonant circuits for causing asymmetric periodic variation of said variable reactances and applying said frequency $2f$ from the other of said power supply circuits to the variable reactances in the remaining resonant circuits to vary the values of said reactances and thereby having a frequency $f$, said power supply circuits coupled to said reactances in said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in the preceding circuits at a time just after the parametric oscillations are generated in the succeeding resonant circuits.

References Cited in the file of this patent

UNITED STATES PATENTS

| 1,544,381 | Elmen et al. | June 30, 1925 |
| 2,721,947 | Isborn | Oct. 25, 1955 |
| 2,723,354 | Isborn | Nov. 8, 1955 |
| 2,805,409 | Mader | Sept. 3, 1957 |
| 2,815,488 | Von Neumann | Dec. 3, 1957 |